J. BRAHN.

Railroad-Frog.

No. 6,573. Reissued Aug. 3, 1875.

Witnesses:
Henry Eichling
B. S. Clark

Inventor.
James Brahn
By J. P. Fitch
Atty.

N. PETERS, PHOTO-LITHOGRAPHER, WASHINGTON, D. C.

BEST AVAILABLE COPY

UNITED STATES PATENT OFFICE.

JAMES BRAHN, OF JERSEY CITY, NEW JERSEY.

IMPROVEMENT IN RAILROAD-FROGS.

Specification forming part of Letters Patent No. 139,291, dated May 27, 1873; reissue No. 6,573, dated August 3, 1875; application filed May 31, 1875.

*To all whom it may concern:*

Figure 1:
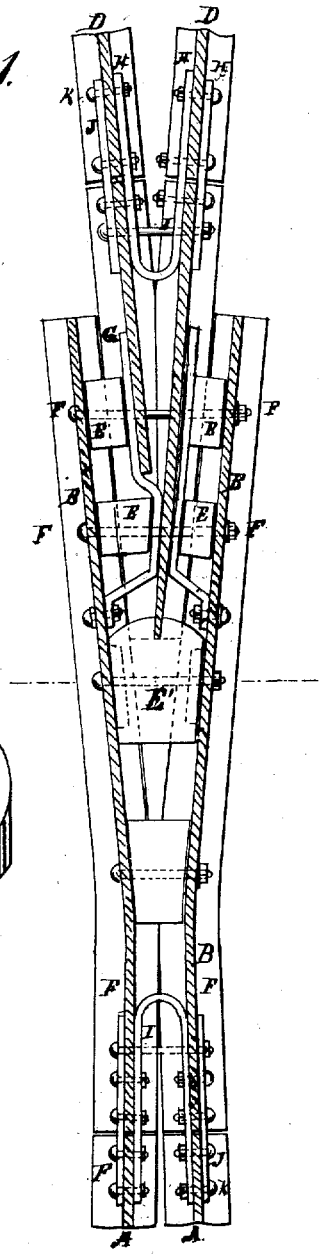
Figure 2:
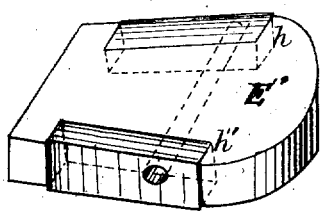
Figure 3:
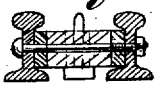

Be it known that I, JAMES BRAHN, of Jersey City, in the county of Hudson and State of New Jersey, have invented a new and useful Improvement in Railway-Frogs, of which the following is a specification:

Figure 1 is a horizontal section of my improved frog. Fig. 2 is a cross-section on dotted line *x x*, Fig. 1. Fig. 3 is a perspective view of a stay-block.

My invention has for its object to furnish an improved railway-frog, made of ordinary rails, which shall be simple in construction, strong, and durable.

The invention consists, first, of the brace-bars, in combination with the point and guard-rails of the frog; second, in the combination with the iron stay-blocks, arranged between the rails of the frog, or the rails and point, of wooden facings, as hereinafter particularly described.

A are the rails of the track. B are the guard-rails of the frog. C is the point, and D are the rails connected with the branches of the point C. The guard-rails B and the point C are connected with each other, and supported in their proper relative positions by blocks E, and by bolts F passing through said blocks, guard-rails, and point, as shown in the figure.

The blocks E should be made of wood and metal combined, as wood alone is quickly destroyed by the elements and by the action of the car-wheels on the frog, and iron alone is too unyielding.

By constructing the main body of the block of iron, and providing wood cushions, arranged between the said body and the rails, a bolt passing through all and binding them together, the advantages of both the comparative indestructibility of metal and the elasticity of wood are secured.

The construction of this combined iron and wooden block is shown in Figs. 2 and 3 of the drawings.

E′ is the iron body of the block, and *h* and *h′* are the wooden cushions. These are preferably placed in recesses cut in the opposite side faces of the iron body, as shown plainly in Fig. 2. The said cushions, being a little thicker than the depth of the recesses, so that they alone will bear against the side rails, should usually have a thickness of about three-fourths of an inch to one inch, which will afford sufficient elasticity, while the proportion of the wood to the iron will be such, and the wood will be so protected by the crown of the rails, that the wood will not, in use, be shattered or crushed so as to seriously impair its function as an elastic cushion. In this combination the iron body serves to maintain the integrity of the wood, and the wood to relieve the too great hardness of the iron.

G are bars which extend along the sides of the point, and between said sides and the blocks E, and are secured in place by the bolts F, that pass through the said point, its supporting-blocks E, and the guard-rails B, and also by rivets. Between the point C and guard-rails B the ends of the bars G are bent outward, and are bolted to the guard-rails B, to strengthen the said point and hold it more securely in place.

The bars used to connect the rails of the track with the rails of the frog may, if desired, have the U shape shown in the drawing.

Having thus described my invention, I claim as new and desire to secure by Letters Patent—

1. The brace-bars G, in combination with the point C and guard-rails B of the frog, substantially as herein shown and described.

2. The combination, in a railway-frog, of the metal body E′ of a stay-block, and the wooden cushions arranged between the said body and the rail or point of the frog, as and for the purpose described.

JAMES BRAHN.

Witnesses:

A. S. FITCH,

FRED. E. BOND.